United States Patent [19]
Brown et al.

[11] Patent Number: 5,220,358
[45] Date of Patent: Jun. 15, 1993

[54] EDGE COATING FOR LAMINATED LENSES

[75] Inventors: Jacqueline L. Brown; Robert J. Paisley, both of Corning; Catherine T. Stutts, Big Flats, all of N.Y.

[73] Assignee: Corning Incorporated, Corning, N.Y.

[21] Appl. No.: 793,177

[22] Filed: Nov. 18, 1991

Related U.S. Application Data

[63] Continuation-in-part of Ser. No. 730,215, Jul. 15, 1991, abandoned.

[51] Int. Cl.$^5$ ................................................. G02C 7/02
[52] U.S. Cl. ...................................... 351/159; 351/166
[58] Field of Search ................. 351/159, 177, 178, 166

[56] References Cited

U.S. PATENT DOCUMENTS 4,427,271 1/1984 Fogg ............................. 351/178 X
4,770,493 9/1988 Ara et al. ............................ 385/102

*Primary Examiner*—Scott J. Sugarman
*Attorney, Agent, or Firm*—C. S. Janes, Jr.

[57] ABSTRACT

This invention is primarily directed to edged three-layer ophthalmic lenses having a coating covering the edge of the lens. The coating provides a cushion between the lens and an eyeglass frame and inhibits the penetration of moisture and tints commonly used to fashion tint ophthalmic lenses. The coating comprises a dimethyl silicone coblocked with vinyl with crosslinking therein being provided through a platinum-catalyzed addition reaction. The inventive coating also imparts advantageous properties to single element glass and plastic lenses.

6 Claims, 1 Drawing Sheet

EDGE COATING FOR LAMINATED LENSES

This application is a continuation-in-part application of Ser. No. 07/730,215, filed Jul. 15, 1991 now abandoned.

BACKGROUND OF THE INVENTION

U.S. Pat. No. 4,793,703 (Fretz, Jr.), assigned to the assignee of the present application, discloses the fabrication of three-layer composite lenses especially suitable for use in ophthalmic applications. As described in that patent, the lenses were comprised of a thin layer of inorganic glass, desirably exhibiting photochromic behavior, which is bonded to an organic plastic layer by means of an adhesive. The fabrication of three- and five-layer lenses comprising glass and polymer layers adhesively bonded together was reviewed in the patent. The prior laminated structures differed from those disclosed in the patent in the following two vital points:

First, the previous workers used an organic polymer (CR-39) exhibiting a linear coefficient of thermal expansion greater than one order of magnitude higher than that of the glass element; $1200-1500 \times 10^{-7}/°$ C. over the range of 0°-100° C. compared to $60-120 \times 10^{-7}/°$ C. over the range of 0°-300° C. In response to that critical problem, the patent discloses the use of organic polymer elements demonstrating linear coefficients of thermal expansion over the range of 0°-100° C. of about $200-700 \times 10^{-7}/°$ C., preferably about $400-600 \times 10^{-7}/°$ C.

Second, the previous workers did not use an adhesive that exhibits flexibility and which can be cured at temperatures in the vicinity of room temperature.

Resins disclosed as being operable as the organic plastic elements were selected from the group of acrylics, imide-modified acrylics, epoxies, polycarbonates, silicones, urethanes, and polyimides, the requirement being that they manifested a linear coefficient of thermal expansion between about $200-700 \times 10^{-7}/°$ C. Epoxy resins comprised the preferred materials.

Resins disclosed as being operable as the organic polymer adhesive were selected from the group of acrylics, epoxies, polycarbonates, silicones, and urethanes, those resins being required to exhibit flexibility and the capability of being cured at temperatures in the vicinity of room temperature. Adhesives derived from epoxy resins comprised the preferred materials.

The preferred glass elements comprised photochromic glasses. A photochromic glass marketed by Corning Incorporated (formerly Corning Glass Works), Corning, NY under the trademark PHOTOGRAY EXTRA, the composition of which is included within U.S. Pat. No. 4,190,451 (Hares et al.), was provided as an illustration of such glasses.

Further development effort to improve upon the basic laminated structures described in U.S. Pat. No. 4,793,703 has led to a three-layer composite comprising an inorganic glass layer or cap consisting of a photochromic glass strengthened via an ion exchange reaction bonded to an organic element prepared from an epoxy resin through a thermoplastic polyurethane adhesive. To prepare the laminate lenses for ophthalmic applications, the epoxy element (which faces the eye of the wearer) is ground and polished to prescription and thereafter coated with a tintable hard coating. The lens is then edged to fit into a frame. The edges of most of the lenses will also be beveled to aid in securing the lens in metal or plastic frames. Some of the lenses will be tinted to meet customer fashion desires. It will be appreciated that, while in use, all of the lenses will be exposed to a variety of sources of moisture, such as perspiration, cleaning fluids, and atmospheric moisture. Edging, beveling, tinting, and exposure to moisture have led to three edge-related problems.

Many of the dyes used in tinting the organic polymer elements are water-based. Those dyes have been observed to be readily absorbed by the thermoplastic polyurethane adhesive. Such absorption results in a band of high coloration around the edge of the lens after fashion tinting. That band is cosmetically objectionable with rimless and clear plastic frames. Furthermore, over a period of several months the tinting migrates into the adhesive toward the center of the lens. That action creates a darkly colored halo in the lens which is again cosmetically unacceptable.

The strengthening of the glass cap via ion exchange must be undertaken prior to laminating the components of the lens together, inasmuch as the laminated composite will not withstand temperatures substantially above 130° C. The edging process removes the ion exchanged layer at the edge of the glass element, thereby sharply decreasing the strength of the glass at the edge.

Beveling further reduces the strength of the edge glass. The bevel comprises a steepled ridge around the circumference of the lens. For both cosmetic and processing reasons, this ridge will preferentially be centered over the adhesive. Thus, centering the steepled portion in that manner hides the adhesive under the frame, a cosmetic advantage. During the beveling process, the adhesive, which doesn't grind well, moves away from the grinding surfaces to center on the groove in the wheel. That action imparts a knife edge to the glass element at the edge. The weakened thin glass edge is readily susceptible to chipping when the lens is inserted into the frame or when the frame is tightened down onto the bevel after insertion thereinto. Chips have also appeared after the eyewear has been in service for some time. The development of such chips may be due to the frames flexing against the weakened glass edge during normal use. It has also been posited that such delayed appearance of chips may be due to localized swelling of the polyurethane adhesive upon exposure to moisture which adds stresses to the weakened glass edge.

Some glass caps have evidenced a tendency to crack after a period of time when tested at high humidity and elevated temperatures. It appears that moisture must be present for the cracks to occur. The cracks originate at the edge and propagate toward the center of the cap. It is believed that moisture propagates tiny flaws that are generated during edging and beveling. It has also been surmised that the problem may be exacerbated by moisture slowly swelling the adhesive exposed at the edge which applies further stresses to the weakened glass edge.

Hence, as has been explained above, the fabrication of laminated lenses of the type disclosed in U.S. Pat. No. 4,793,703 has been hampered by three problems; viz., the absorption of tint by the adhesive, the glass chipping and/or cracking during framing, and delayed chipping of the glass in the presence of moisture. Solutions to the individual problems were investigated, those solutions adding processing steps. Therefore, the primary objective of the present invention was to devise a single means for solving all three of the cited problems.

Whereas the problems of glass chipping and/or cracking during framing and delayed chipping of the glass in the presence of moisture are particularly severe with laminated lens structures, the same problems are likewise present, but to a lesser degree, with single element glass lenses. Thus, single element glass lenses must also be edged and beveled prior to being secured into frames. And, therefore, the edges of those lenses are subject to the same stresses and exposure to moisture as are encountered by the laminated lenses. Accordingly, it was believed that an inventive solution for the problems faced by the laminated lens structures would be equally applicable to single element glass lenses.

The use of a single element plastic or glass lens quite apparently eliminates the need for the edge coating to contain a tint barrier inasmuch as there is no adhesive layer exposed to absorb tint. Furthermore, as has been explained above, the protection to chipping provided by the edge coating is not as critical as is required in laminated lens structures. There is one especially useful function, however, which the coating performs for both the laminated lens structures and the single element lenses; viz., the ability to recover lenses which have been sized too small for the frame. To explain:

Occasionally a lens will be cut slightly too small during processing to fit securely in the frame. On such occasions the lens must either be discarded and a new lens processed, or the lens or frame must be modified to obtain a sound fit. The most common method of accomplishing that modification is to use what has been termed a "lens liner". This lens liner material is supplied as a thin V-shaped ribbon which is inserted between the bevel of the lens and the frame to fill the space between the frame and undersized lens. The lens liner, however, is not cemented or otherwise attached to either the lens or the frame, and is difficult to hold during insertion of the lens into the frame. Moreover, because it is not attached to either the frame or the lens, loss of the lens by slipping out of the frame is hazarded. The inventive edge coating possesses three important advantages over the lens liner:

(1) because the edge coating becomes an integral part of the lens, insertion of the lens into the frame is easy;
(2) because the edge coating is bonded to the lens, the potential for loss of the lens through slipping out of the frame is removed; and
(3) because of the compliant nature of the coating, it readily and accurately conforms to any minor irregularities in the frame, thereby providing a better fit.

SUMMARY OF THE INVENTION

In seeking to find the single means for solving all three of the problems encountered with laminated lens structures, we first studied possible solutions to each individual problem. For example, a barrier against absorption of tint by the adhesive can be provided by temporarily covering the edge of the laminate during the tinting process, or a permanent sealant can be applied to the edge of the laminate. Where the sealant is composed of a material which will also bar the ingress of moisture, it could reduce delayed chipping and cracking of the glass cap in the presence of moisture. A temporary cover or permanent sealant would, however, offer little protection against cracking and chipping occurring during framing of lenses.

The use of a liner or gasket in a lens frame to reduce cracking and chipping of edged lenses is well known in the industry. That practice, however, provides little, if any, protection against moisture ingress and no barrier to tint absorption, inasmuch as the lenses are tinted before being placed into frames.

Therefore, our research was directed primarily to developing a coating which, when applied to the edge of a three-layer laminated lens structure that has been edged and optionally beveled, will provide a barrier against tint penetration, will bar the ingress of moisture, and will furnish a cushioning between the edge of the lens and the frame as the lens is inserted and tightened down thereinto.

In summary, the operable coating material must exhibit the following three properties:
(a) it must be soft enough to provide cushioning between the lens and the frame;
(b) it must be capable of acting as a moisture barrier to inhibit penetration of water to the glass and the adhesive; and
(c) it must be resistant to absorption of the tinting dyes to protect the adhesive from exposure to the dyes.

Additional requirements of the coating include: good adhesion to both the glass and the organic plastic; easy application to the edge; relatively rapid cure at temperatures below 130° C; good durability against ultraviolet radiation and temperature variations; and a cosmetically acceptable appearance (preferably clear and colorless).

Many materials were evaluated as candidate coatings including representatives of ultraviolet radiation curable resins, epoxies, acrylates, hot melts, heat shrink films, foams, PVDC, PVC, and waxes. Several of the materials met some of the above requirements, but we found only one that met all of them. That material is marketed by McGhan NuSil Corporation, Carpinteria, Ca under the designation R2186. The material is a dimethylsilicone coblocked with vinyl, crosslinking therein being provided via a platinum-catalyzed addition reaction. A silane-titanate primer therefor is marketed by the same company under the designation CF1-135 Primer and is conveniently applied to the edged lens prior to the application of the silicone coating to improve adhesion of the coating to the edged lens.

DESCRIPTION OF PREFERRED EMBODIMENTS

Figure 1:
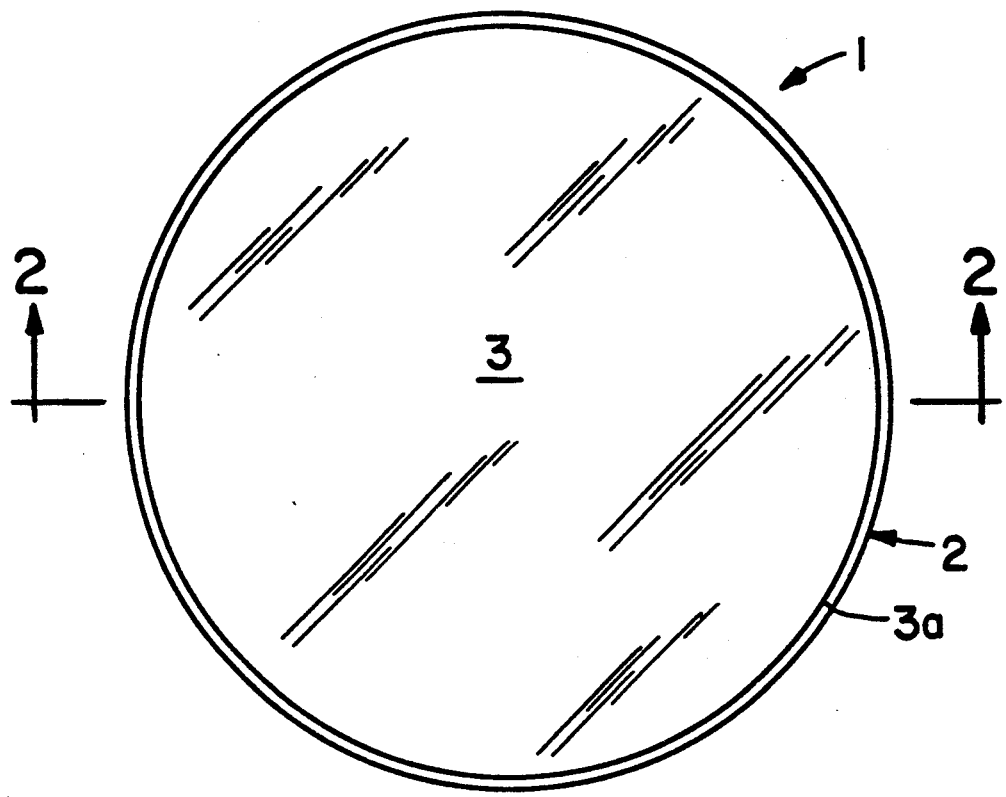
FIG. 1 comprises a top plan view of a lens structure having the inventive coating surrounding and covering the edge of said lens structure.

FIG. 1 is a top plan view of a lens structure, generally designated 1, looking down on glass element 3 having a coating 2 in accordance with the present invention surrounding and covering the edge 3a of said lens structure.

Figure 2:
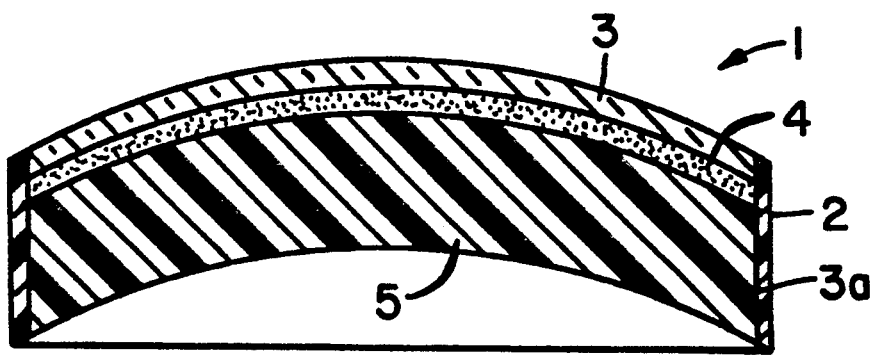
FIG. 2 comprises a cross-sectional view taken along line 2—2 in FIG. 1.

FIG. 2 is a cross-sectional view along line 2—2 in FIG. 1 illustrating the internal structure of lens structure 1. Thus, said lens structure consists of inorganic glass layer 3 bonded to organic plastic layer 5 through organic adhesive layer 4. Coating 2 of the present invention surrounds and covers edge 3a of said lens structure 1.

Table I below records a number of materials which were evaluated and their actions during and after application to edged samples of three-layer lenses, wherein the glass element was an ion exchange strengthened photochromic glass having a thickness between about 1.0–1.25 mm marketed by Corning Incorporated under the designation Corning Code 8134, the composition of which is included within U.S. Pat. No. 4,608,349 (Kerko et al.). The glass was bonded to an epoxy polymer having a prescription ground into the back surface thereof through a thermoplastic polyurethane adhesive.

The tint used in the tests is a water soluble azo red dye marketed by Brainpower, Inc., Miami, Fl, which is commonly employed in the industry as a fashion tint. After curing the coatings, the lenses were immersed into the dye for 15 minutes at 100° C. After withdrawal from the bath of dye, the lens samples were rinsed with distilled water and the coatings examined for dye pickup. Thereafter, the lenses were held overnight in an oven operating at 100° C. to accelerate migration of the tint into the adhesive. The lenses were withdrawn from the oven and again examined for dye pickup by the adhesive.

A humidity cabinet and a water bath were utilized to test for glass cap cracking and chipping in the presence of moisture. A firm correlation between the results observed after immersion in the water bath and after exposure to high humidity has not been completely established. Nonetheless, it has been noted that, in general, lenses doing poorly in one test also do poorly in the other.

In carrying out the humidity test, framed lenses are placed into a humidity cabinet operating at 50° C. and 98% relative humidity. The lenses are checked daily for chips and cracks, the test extending for 30 days.

In carrying out the water bath test, framed lenses are immersed into bath of distilled water operating at 80° C. The lenses are checked hourly for chips and cracks, the test being completed in 30 hours.

The selection of materials for initial screening was based upon the following characteristics: cure temperature, hardness, and cured color. Thus, the curing temperature must not exceed about 130° C. because at temperatures substantially above that limit the adhesive will melt, thereby leading to delamination of the lenses. Soft and flexible materials are needed to cushion the edge of the lenses during framing, and to provide protection when the frames are flexed during normal wear. Color is an important feature because a highly colored edge coating on ophthalmic lens is distracting to the wearer and is unacceptable cosmetically. Transparent to lightly translucent and colorless or but slightly colored materials were selected. Furthermore, the coating must not take on color when exposed to dyes used for fashion tinting.

The coatings were applied to the edge of the lenses with a paint brush or a syringe with a grooved plastic tip. When the coating was applied via a syringe, the lenses were mounted on the rotating holder of an optical laboratory groover for ease of application. The coatings were thereafter cured in accordance with the manufacturer's specifications.

TABLE I

| Material | Hardness | Ease of Application | Cure Temperature and Time | Cured Color |
|---|---|---|---|---|
| Denturite Bris, Inc. | N/M* | Poor/ syringe | Room temp. 1 minute | Pink opaque |
| F-9473PC Acrylic Tape 3M Corp. | N/M* Flexible | Poor-fair, double stick tape | N/A** (Tape) | Colorless translucent |
| 2216 B/A Epoxy 3M Corp. | N/M* Flexible | Good/ brush | 110° C./1 hr | Straw color transparent |
| 1103 Clear Sealant 3M Corp. | N/M* Flexible | Poor/ syringe | Room temp. 5–10 min. Complete in 24 hours | Colorless transparent |
| 4475 Plastic Adhesive 3M Corp. | N/M* Flexible | Poor/ syringe | Room temp. 24 hours | Colorless transparent |
| Light Weld 415 Dymax Corp. | 85 Shore D | Good/ brush | UV light 48 hours | Colorless translucent |
| 2125 Polyamide Hot Melt Adhesive H. B. Fuller Co. | N/M* Flexible | Poor/ syringe | N/A** (Hot Melt) | Straw color transparent |
| Silicone II General Elec. | 25 Shore A | Fair-Poor/ syringe | Room temp. 24 hours | Colorless translucent |
| NuSil R2615 Silicone McGhan Corp. | 45 Shore A | Fair/ syringe | 110° C./ 0.5 hour | Colorless translucent |
| NuSil R2186 Silicone McGhan Corp. | 30 Shore A | Fair/ syringe | 110° C./ 0.5 hour | Colorless translucent |

| Material | Adherence to Edge | Coating Tinted | Tint Absorbed by Coating |
|---|---|---|---|
| Denturite Bris, Inc. | Poor | N/R*** | N/R*** |
| F-9473PC Acrylic tape 3M Corp. | Good | Yes dark | Yes |
| 2216 B/A Epoxy 3M Corp. | Good | Yes very dark | Yes |
| 1103 Clear Sealant 3M Corp. | Good light | Yes | No |
| 4475 Plastic Adhesive 3M Corp. | Good dark | Yes | Yes |
| Light Weld 415 Dymax Corp. | Good | Yes very dark | No |
| 2125 Polyamide Hot Melt Adhesive H. B. Fuller Co. | Good | Yes dark | No |
| Silicone II General Elec. | Fair | No | No |
| NuSil R2615 Silicone McGhan Corp. | Good with primer | No | Yes in spots |
| NuSil R2186 Silicone McGhan Corp. | Good with primer | No | No |

*Not measured.
**Not applicable.
***Not relevant because adherence was so poor.

Whereas NuSil R2186 can be used neat, to improve ease of application, to secure a more uniform coating, and/or modify the time required for curing, various diluents may be added thereto. Laboratory experience indicated toluene to be the preferred diluent, although other liquids in which the silicone is soluble, for example, 1-1-1 trichloroethane, xylene, and acetone, can also be used.

To illustrate the versatility of the NuSil R2186 with a variety of single element plastic lenses, Table II below records its application to several commercially marketed plastic lenses. In each instance the lenses were primed and the coating thereafter applied employing a syringe-type disperser with a grooved metal applicator tip; the lenses being mounted on the rotating holder of an optical laboratory groover for each application. The coatings were cured in accordance with the manufacturer's specifications. After curing, the coatings were examined visually and manually (mechanically) checked for adhesion to the lenses. In all cases the cured coating was colorless and translucent, and adhesion of the coating to the edge of the lens excellent.

In Table II Silor CR-39 and Silor Super Shield lenses were prepared from CR-39-based resins. Gentex Polycarbonate and Gentex Fritable Polycarbonate lenses were prepared from polycarbonate-based materials. The Optima Hyper Index No Index lens was prepared from a crosslinked polyurethane. The Younger Optics Younger Lite 1.56 lens was believed to be prepared from a diallylphthalate.

TABLE II

| Silor CR-39 | Gentex Polycarbonate | Optima Hyper Index No Index |
|---|---|---|
| Silor Super Shield | Gentex Fritable Polycarbonate | Younger Optics Younger Lite 1.56 |
| Super Major CR-39 | | |

We claim:

1. An edged three-layer ophthalmic lens having a coating covering the edge of said lens, said lens comprising a thin inorganic glass layer bonded to an organic plastic layer through an organic adhesive layer that exhibits flexibility, that can be cured at temperatures in the vicinity of room temperature and that readily absorbs moisture and organic tints commonly used to fashion tint ophthalmic lenses, said coating being soft enough to provide cushioning between said lens and an eyeglass frame, being capable of inhibiting the ingress of moisture, being capable of barring the penetration of said tints, and consisting essentially of a dimethyl silicone coblocked with vinyl with crosslinking therein being provided through a platinum-catalyzed addition reaction.

2. A lens according to claim 1 wherein said inorganic glass layer exhibits a linear coefficient of thermal expansion within the range of about $60-120 \times 10^{-7}/°$ C. over the temperature interval of $0°-300°$ C.

3. A lens according to claim 1 wherein said organic plastic layer exhibits a linear coefficient of thermal expansion within the range of about $200-700 \times 10^{-7}/°$ C. over the temperature interval of $0°-100°$ C.

4. A lens according to claim 1 wherein said organic adhesive is a thermoplastic polyurethane.

5. A lens according to claim 1 having a silane-titanate primer under said coating.

6. An edged single element glass or plastic ophthalmic lens having a coating covering the edge of said lens, said coating being soft enough to provide cushioning between said lens and a eyeglass frame, being capable of inhibiting the ingress of moisture, and consisting essentially of a dimethyl silicone coblocked with vinyl with crosslinking therein being provided through a platinum-catalyzed addition reaction, said lens having a silane-titanate primer under said coating.

* * * * *